AUDIO-VISION TAPE PROJECTOR AND PROGRAMMED RESPONDER

Filed Feb. 28, 1968

INVENTOR
D. J. STAPLETON
BY Glascock, Downing & Seebold
ATTORNEY

AUDIO-VISION TAPE PROJECTOR AND PROGRAMMED RESPONDER

Filed Feb. 28, 1968

Jan. 19, 1971 D. J. STAPLETON 3,556,654

AUDIO-VISION TAPE PROJECTOR AND PROGRAMMED RESPONDER

Filed Feb. 28, 1968 8 Sheets-Sheet 4

Jan. 19, 1971 D. J. STAPLETON 3,556,654

AUDIO-VISION TAPE PROJECTOR AND PROGRAMMED RESPONDER

Filed Feb. 28, 1968 8 Sheets-Sheet 7

3,556,654
AUDIO-VISION TAPE PROJECTOR AND PROGRAMMED RESPONDER

Daniel John Stapleton, "Clareen," Dublin Road, Swords, Dublin, Ireland
Filed Feb. 28, 1968, Ser. No. 709,085
Int. Cl. G03b *31/06*
U.S. Cl. 353—15 12 Claims

ABSTRACT OF THE DISCLOSURE

An audio-vision tape projector for use in the field of education and entertainment in which a particular sequence of vidio information and the associated audio information are stored in a self contained unit which can be inserted into and removed from the apparatus as one entity. The unit includes a mangetic tape spool and a disc mounted coaxially with the spool and carrying elements of vidio information at circumferentially spaced positions thereon. The tape on the spool has recorded thereon control signals and audio information associated with the vidio information and the unit is also equipped with means which is operable responsive to a signal related with the audio information for interrupting or altering the vidio information.

The present invention concerns an audio-vision tape projector and ancillary equipment for use in a system for relaying and displaying information in the form of sound and vision. The invention is particularly suited for use in an automated classroom but has other applications in the fields of learning working and entertainment.

It is known to reproduce programmed information with visual and audio aids by the employment of a slide projector synchronizer and a tape recorder, but the arrangement referred to is cumbersome and it is an object of the present invention to mitigate this disadvantage.

According to the invention, there is provided an audio vision tape projector comprising a compact unit having means for projecting video information and having means for simultaneously relaying corresponding audio information, said unit advantageously incorporating means, operable in response to a signal associated with said audio information, for interrupting or altering said video information.

Preferably, the audio vision tape projector comprises a unit having, or being adapted to receive, a magnetic tape spool containing audio information and a disc for carrying slides containing video information, said unit incorporating means for rotating said disc simultaneously with said tape spool or at predetermined intervals relative to said tape spool in response to electrical signals. Advantageously, the electrical signals may be incorporated in a magnetic tape conveying the audio information to be relayed and provided on the tape spool. When carrying combined visual and audio information, the audio vision tape projector holds the slide disc in a predetermined position in which a slide containing visual information is displayed on a screen while the tape relays audio information concerning the projected slide. When the audio information relative to the projected slide has been exhausted, electrical impulses on the magnetic tape operate mechanism which temporarily releases the slide disc to enable it to rotate simultaneously with the magnetic tape carrying spool until a fresh slide is displayed by the projector, whereupon the slide disc is again locked in position for a predetermined interval.

Ancillary to the audio vision projector there may be provided for certain usages, a programmed responder consisting of an electrically controlled signal panel affording a means of communication between an operator or teacher controlling the conveyance of audio and visual information to a predetermined number of persons. Alternatively, under certain circumstances, the programmed responder may be used apart from the audio vision tape projector.

Figure 1:
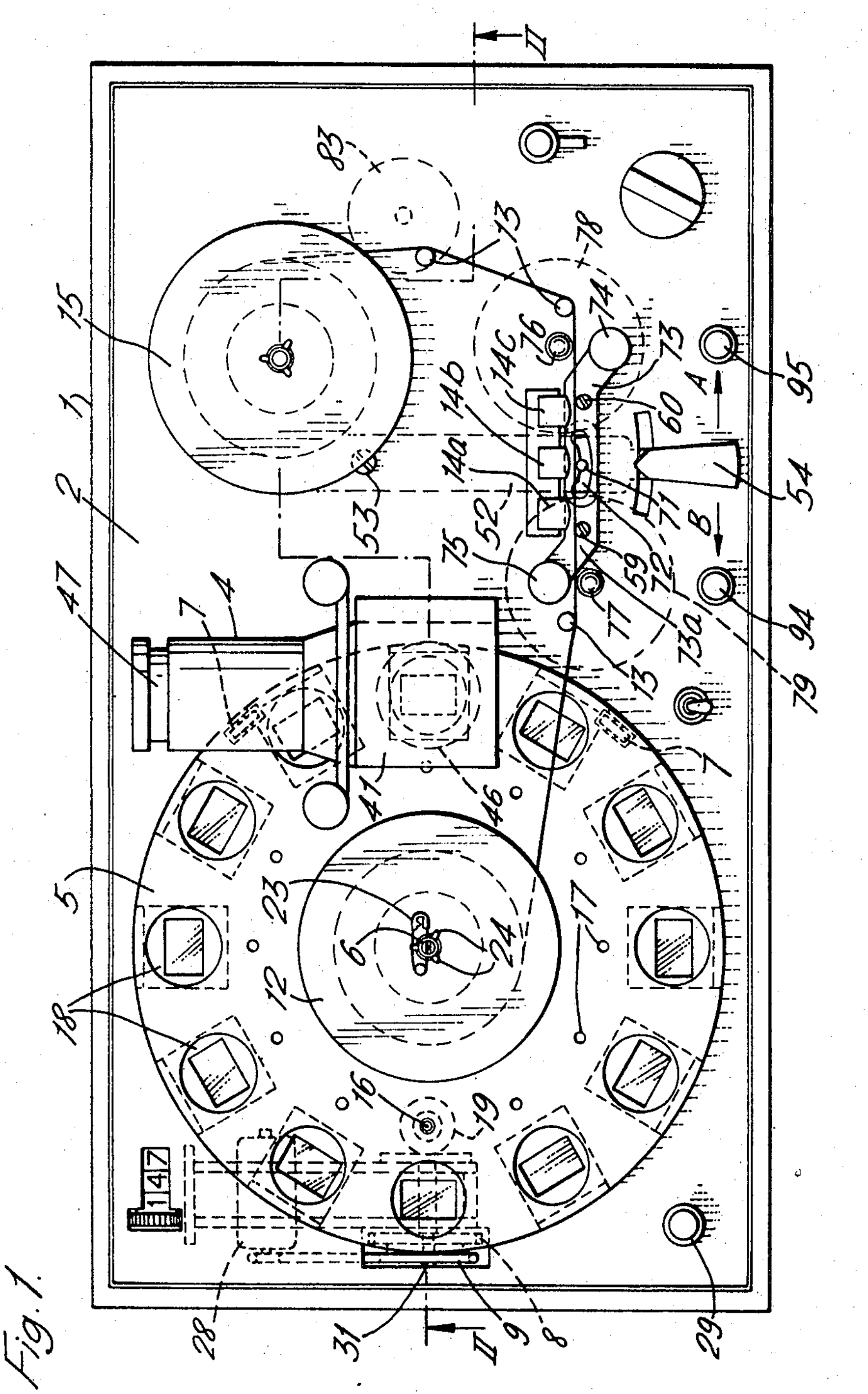
Figure 2:
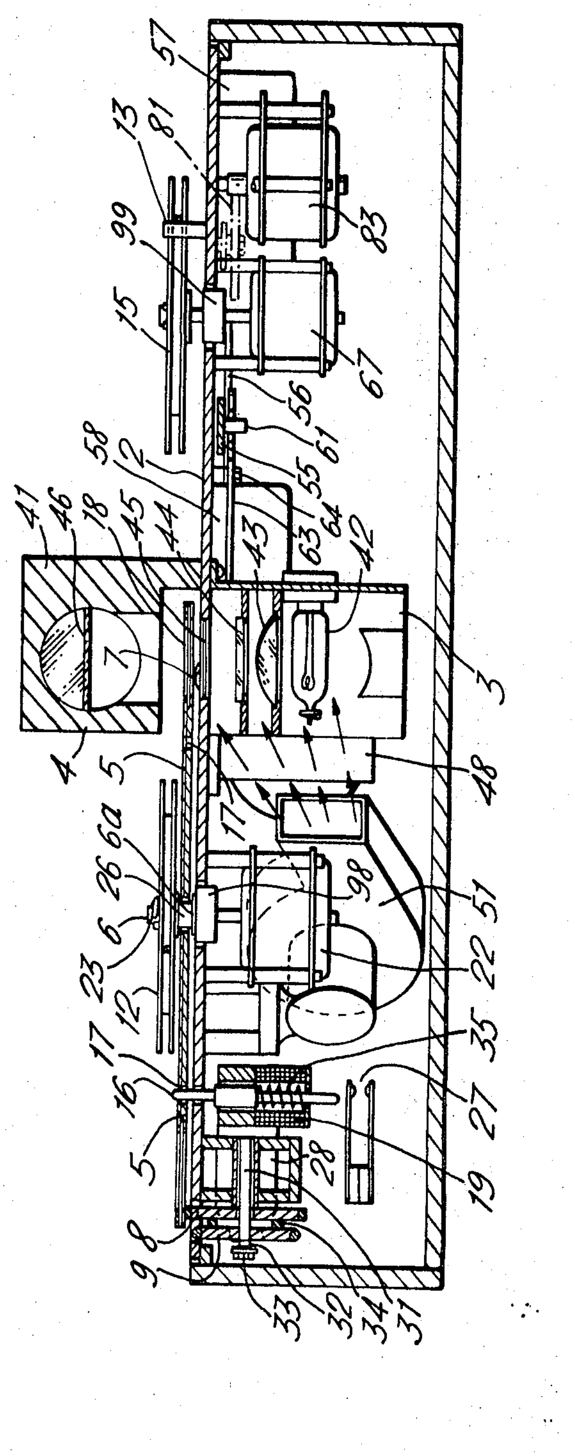
Figure 3:
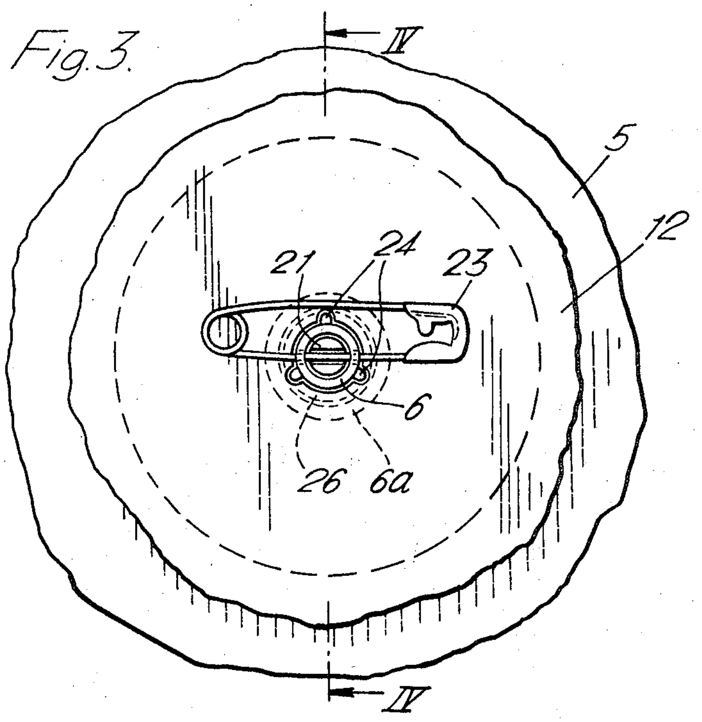
Figure 4:
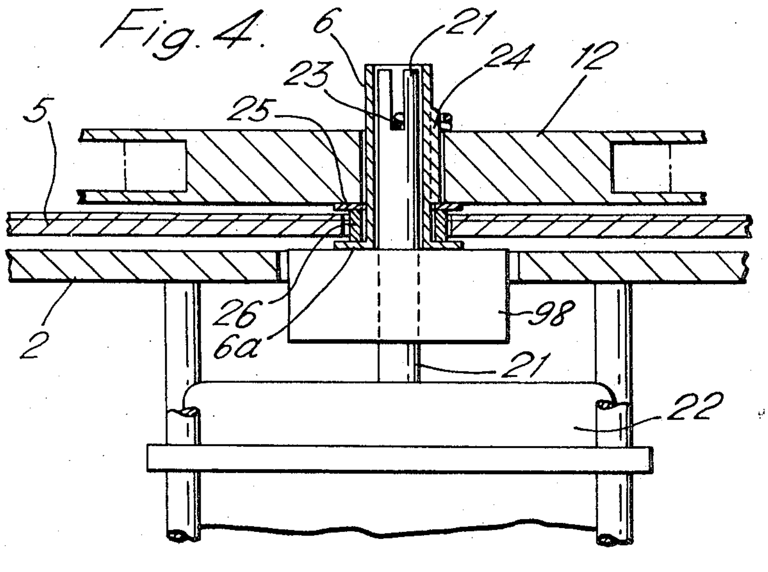
Figure 5:
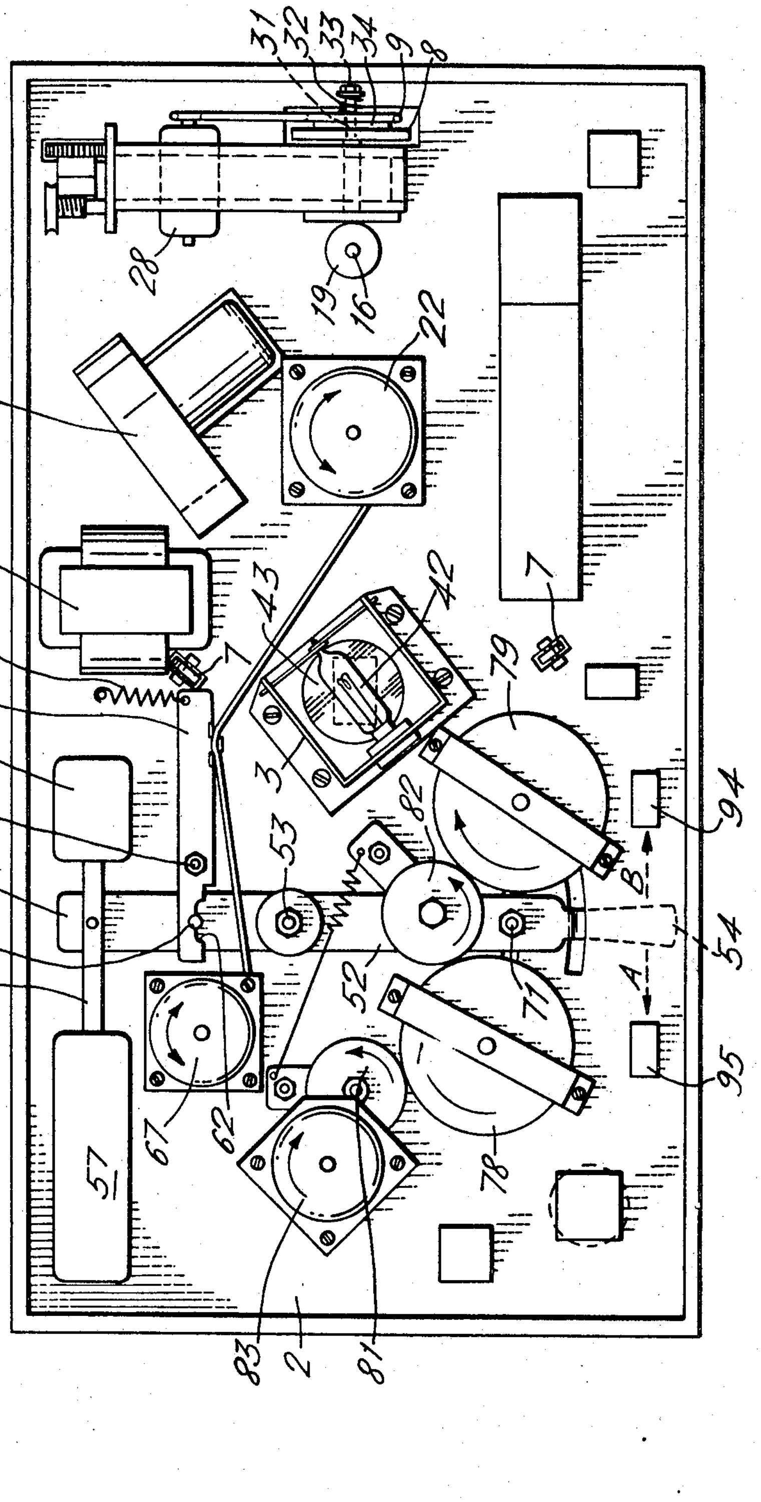
Figure 6:
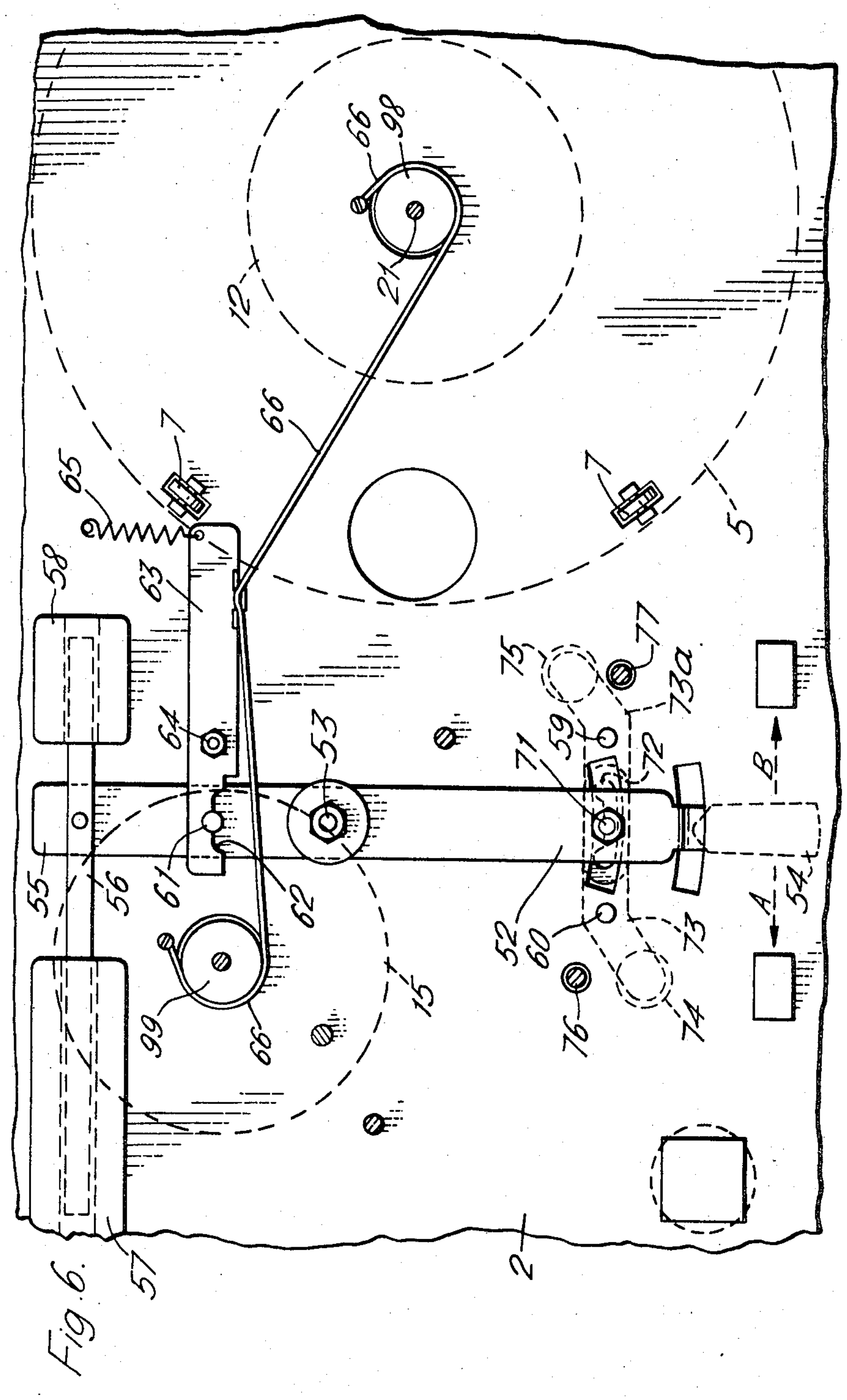
Figure 7:
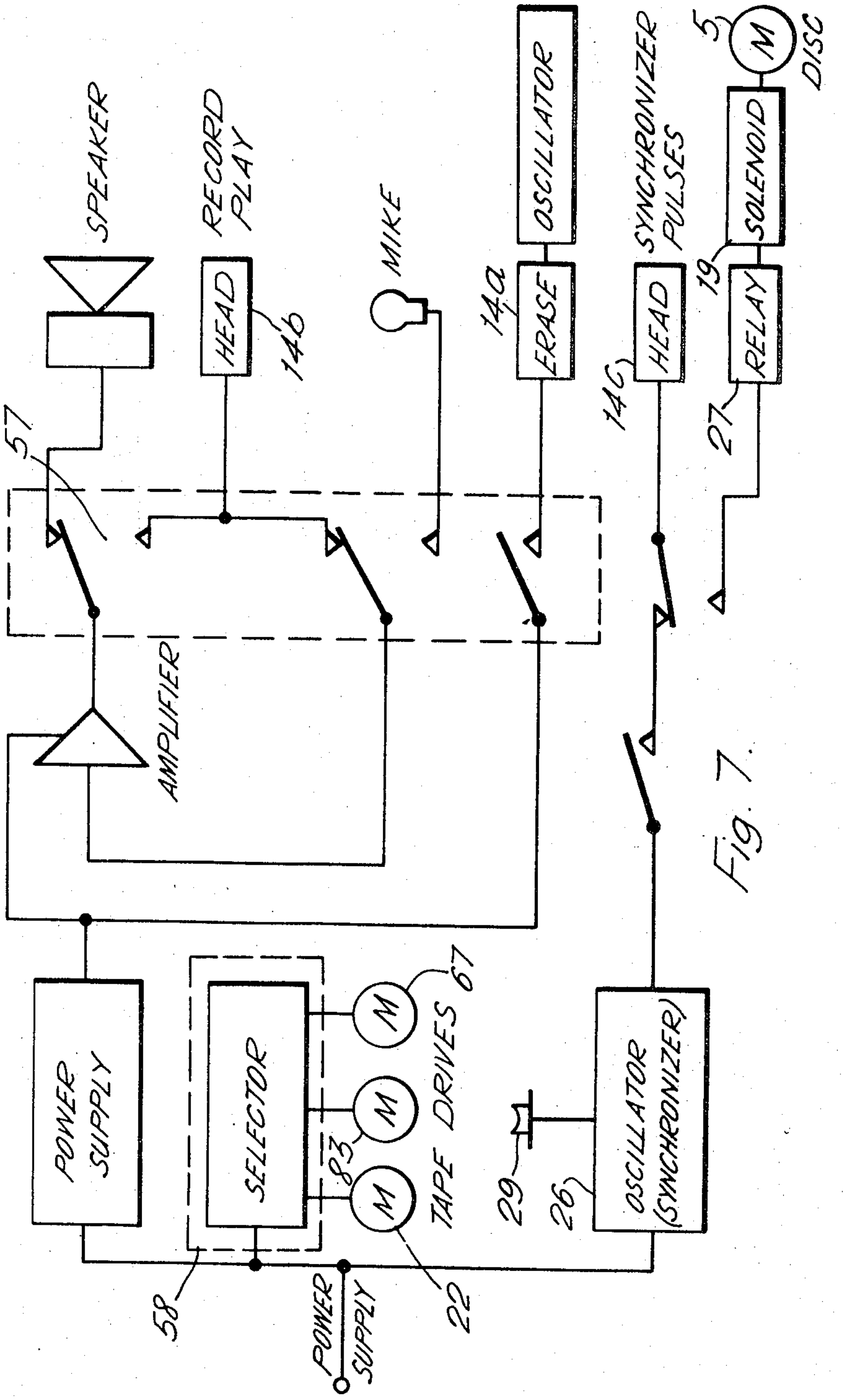
Figure 8:
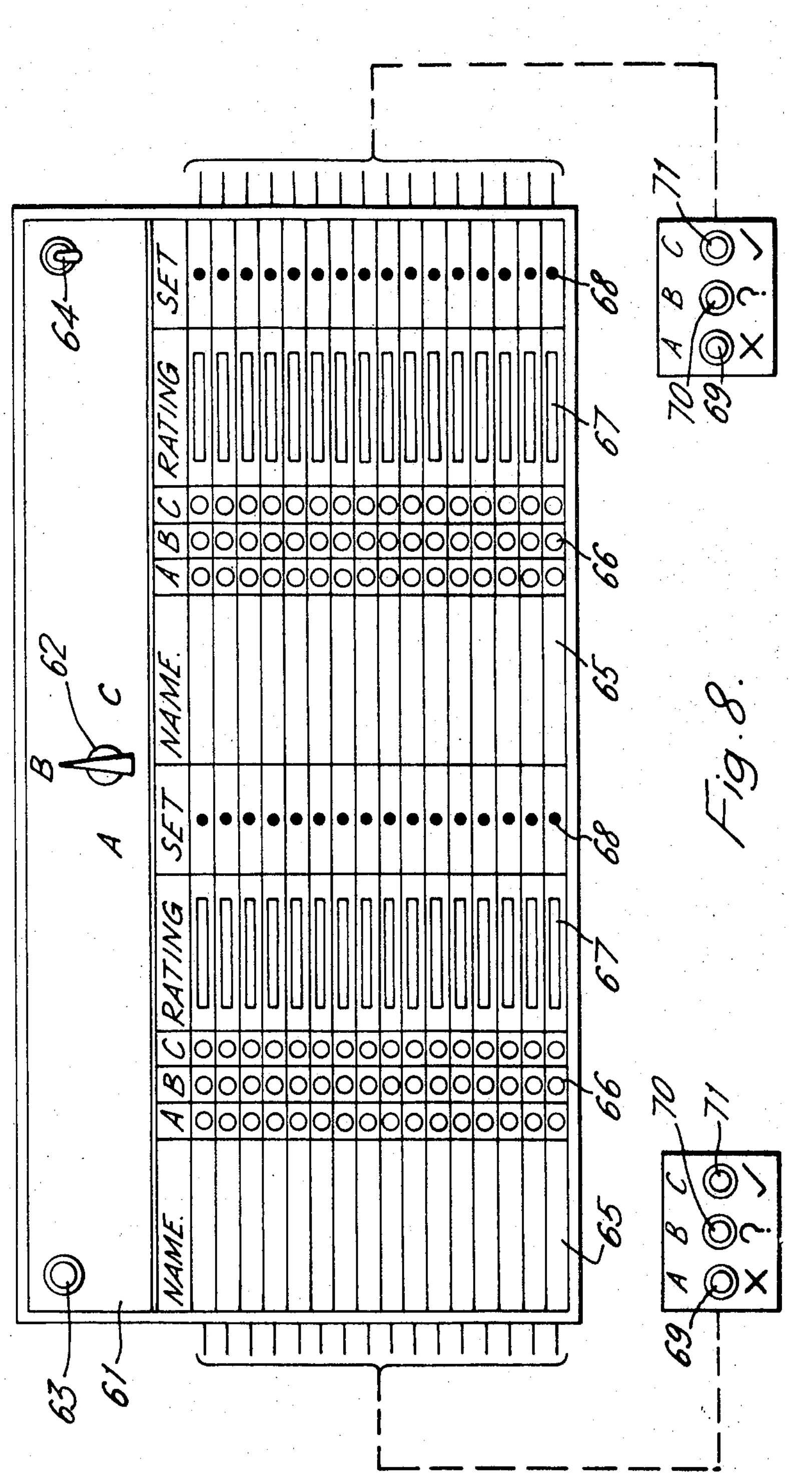
Figure 9:
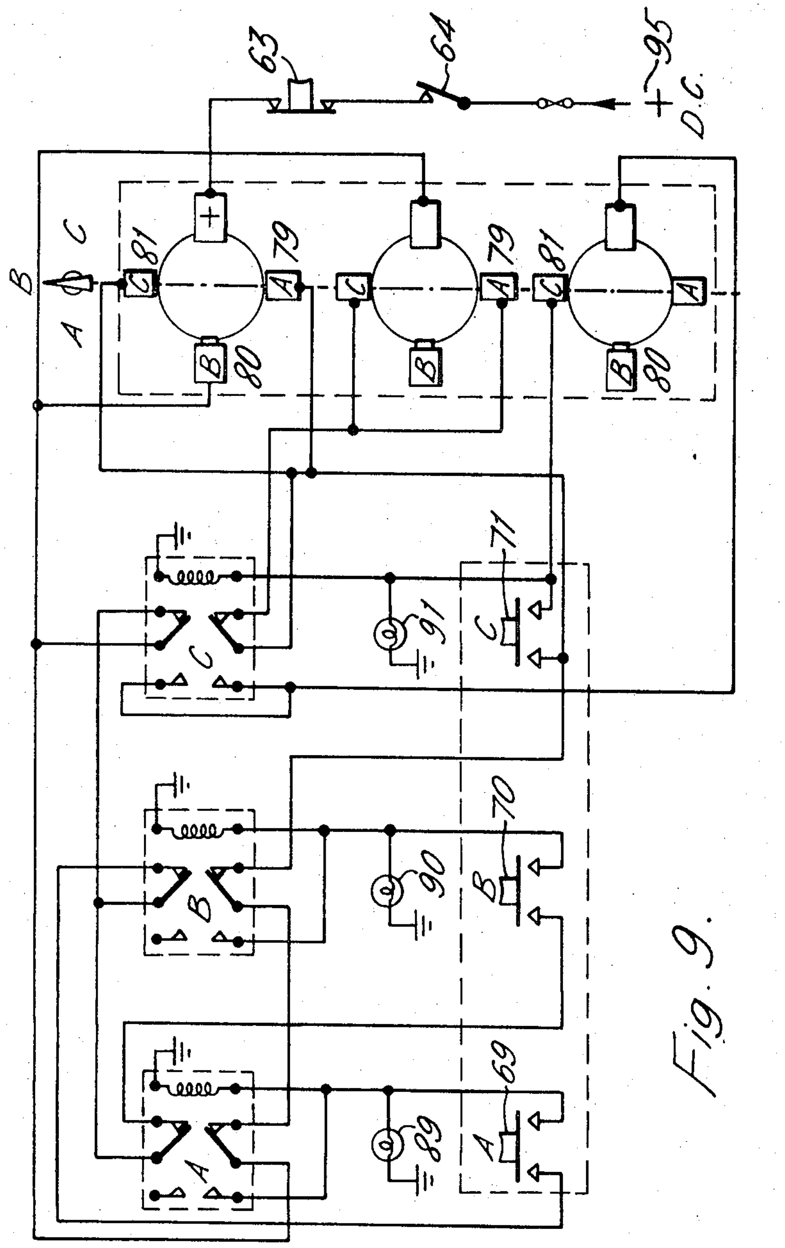

The invention will hereinafter be described more fully with reference to the accompanying drawings, which illustrate, by way of example only, a preferred embodiment thereof, and wherein, FIG. 1 is a plan view of the audio vision tape projector, FIG. 2 is an elevation, in section, on lines II—II of FIG. 1, FIG. 3 is a plan view, to an enlarged scale, of portion of FIG. 1, FIG. 4 is an elevation, in section, on lines IV—IV of FIG. 3, FIG. 5 is a plan view of the underside of FIG. 1, FIG. 6 is a view showing details of FIG. 5, FIG. 7 is a block circuit diagram of the audio vision tape projector, FIG. 8 is a plan view of the programmed responder and FIG. 9 is a circuit diagram of the arrangement shown in FIG. 8.

Referring to the drawings, the audio vision tape projector comprises a cabinet 1 provided with a unit deck 2 supporting, below the unit deck 2, a housing 3, and supporting, above the unit deck 2, a projector 4.

Mounted parallel to the unit deck 2 is a slide disc 5 located on a ferrule 6 and supported by a pair of rollers 7 and a drive wheel 8 driven by a pulley wheel 9. Also mounted on the ferrule 6 is a tape spool 12 from which tape is passed via guides 13, erase, play/record and signal synchronizer heads 14*a*, 14*b* and 14*c* respectively to a take-up spool 15. The slide disc 5 is held for projection by a plunger 16 spring biassed to enter registration apertures 17 associated with slide holders 18 incorporated in the slide disc 5 and arranged in circular formation around the latter. The plunger 16 may be withdrawn, from the registration aperture 17 to enable the slide disc 5 to rotate, upon operation of a solenoid 19 in response to an electrical signal on the magnetic tape provided on the tape spool 12.

The slide holders 18 are formed by slots in the slide disc 5, slides being adapted to be located in slots in the slide disc 5. The slides are inserted into the slide holders 18 from the circumference of the slide disc 5, or from an opening in the centre area of the slide disc 5.

As shown more particularly with reference to FIGS. 3 and 4, the ferrule 6 is mounted upon a spindle 21 rotatable by an electric tape spool motor 22. The ferrule 6 is keyed to the spindle 21 by a safety pin 23 which also serves to hold the tape spool 12 upon the ferrule 6. Three keys 24 which are integral with the ferrule 6 lock the tape spool 12 upon the ferrule 6, the arrangement being such that rotation of the spindle 21 is transmitted through the ferrule 6 to the tape spool 12. The slide disc 5 is mounted between the base 6*a* of the ferrule 6 and a separating washer 25. A distance piece 26, which is thicker than the slide disc 5, maintains a clearance between the slide disc 5 and the ferrule 6 when the slide disc 5 is located upon the rollers 7 and drive wheel 8 associated with the unit deck 2. The ferrule 6 is adapted to retain the slide disc 5 and tape spool 12 together in the form of combined audio vision information capable of being stored as a unit and capable of repetitive playing.

Rotation of the slide disc 5 upon retraction of the plunger 16 is effected by the means described hereinafter. Upon operation of the solenoid 19 in response to an electrical signal passed from a synchroniser 26, the plunger 16 moves downwardly to free the slide disc 5 for rotation and to effect closure of a relay 27 thereby enabling current to flow to inertia motor 28 which drives the pulley wheel 9 rotatably mounted upon a shaft 31. A compression spring 32 mounted upon the shaft 31 between a nut 33 and the drive wheel 8 presses the pulley wheel 9 into clutch engagement with the drive wheel 8 through the intermediary of a felt slip ring 34 located between the pulley and drive wheels 9 and 8 respectively. The felt slip ring 34 acts as a clutch or slipping force when the slide disc 5 is held against rotation by location of the plunger 16 in a registration aperture 17. The electrical signal relayed to the solenoid 19 to effect retraction of the plunger 16 is interrupted, before the slide disc 5 is rotated to the next registration aperture 17, to enable the plunger 16 to enter the next registration aperture 17 under the pressure of spring 35. The synchroniser 26 has a manual control button 29.

A projector 41 is mounted in a vertical plane on the instrument deck 2 and comprises a light source in the form of a quartz lamp 42 located in the housing 3 and powered by a transformer 48. Light from the lamp 42 is adapted to pass through a condenser lens 43, heat shield glass 44 and lens 45 through the transparent slide holder 18 to mirror 46 and on to the focussing lens 47 which in turn provides horizontal projection to a screen (not shown).

A turbo fan 51 is adapted to convey cool air to the area of the lamp 42 and beneath the slide holder 18.

The audio vision tape recorder has a control lever 52 pivotably connected to the underside of the tape deck 2 by a pivot pin 53. One end of the control lever 52 serves as an operating handle 54 by means of which the lever 52 is movable about the pivot pin 53. The end 55 of the control lever 52 has a transverse arm 56 movement of which, in response to movement of the control lever 52, serves to effect operation of switches contained in housing 57 and 58 shown more clearly with reference to FIG. 7 of the drawings.

An abutment 61 on the control lever 52 acts against a cam 62 on a braking member 63 pivotably connected to the deck 2 by a pivot pin 64. A spring 65 operatively connected between the deck 2 and one end of the braking member 63 serves to maintain the braking member 63 in the position shown in FIG. 6, in which position the braking member 63 operates to maintain a ribbon 66 in engagement with drums 98 and 99 associated with tape motors 22 and 67 so as to prevent the tape from running off the tape spools 12 and 15 when the control lever 52 is in the central or "off" position shown in FIG. 6.

A further abutment 71 on the control lever 52 is movable in a slot 72 provided in control members 73 and 73*a* so as to cause movement of the latter substantially about the pivot pins 59 and 60. The control members 73 and 73*a* support respectively a forward pressure roller 74 and a backward pressure roller 75 which are adapted to force tape, passing between the tape spools 12 and 15, into altenate contact with the spindles 76 and 77 of forward and reverse capstans 78 and 79 respectively which are adapted to be driven through drive wheels 81 and 82, by a capstan motor 83.

On moving the control lever 52 in the direction of arrow A (see FIGS. 1 and 6), the forward pressure roller 74 maintains the tape in contact with the spindle 76 which is rotating in the direction which causes the tape to be fed from the tape spool 12 to the tape spool 15. Simultaneously, the transverse arm 56 effects closure of the appropriate electrical contacts to cause operation of the audio vision tape projector in the manner described above. The slide disc will rotate when the plunger 16 is withdrawn upon an appropriate signal being received by the solenoid 19.

When the control lever 52 is moved in the direction indicated by arrow B (FIGS. 1 and 6), the backward pressure roller 75 maintains the tape in contact with spindle 77 which is rotating in the direction which causes the tape to be fed from the tape spool 15 to the tape spool 12. The slide disc will also rotate in the same direction when the plunger 16 is withdrawn upon an appropriate signal being received by the solenoid 19.

Buttons 94 and 95 are provided, as on conventional tape recorders, for enabling the tape spools 12 and 15 to be rotated for fast forward and backward winding.

Conventional recording means is provided for producing combined audio vision information for use on the audio vision tape projector.

The programmed responder illustrated in FIGS. 8 and 9 comprises a console panel 61 operatively connected with sets of remotely disposed student units each having buttons 69, 70 and 71. The function of the student units is to enable confidential communication to be effected between individual students and teacher during or after the relaying of information, for example, in the form of a lesson, to the audio vision tape projector unit, but the programmed responder may also be employed to monitor a class during or after a conventionally directed lecture.

Directly connected to each set of student buttons 69, 70 and 71 are three lights 66, a digit counter 67 and a rate recording button 68, space for the students name or other reference being provided at panel 65. The teachers control consists of a programming switch 62 capable, upon appropriate operation, of programming the student buttons 69, 70 and 71 into modes A, B or C as will be described. A cancel button 63 enables all student signals to the teachers console panel 61 to be interrupted and a power switch 64 permits the entire apparatus to be isolated from the main supply.

A teacher may operate programming switch 62 for the purpose of enabling the unit to operate in three separate modes designated by modes A, B and C. Movement of programming switch 62 to achieve operation in mode A connects contact 79 to the D.C. supply 95 and thereby enables bulbs 89 and 90 to light upon depression of student buttons 69 or 70, while depression of student button 71 short circuits the supply and extinguishes bulbs 89 and 90. During the A mode the student may press button 69 if the lesson is not understood or the student may press button 70 if he should desire to raise a query. As a further alternative depression of button 71 cancels the action of previously depressed buttons 69 or 70 by short circuiting bulbs 89, 90 and 91 in the event that further elucidation should clarify the lesson or obviate the necessity for a query.

During mode B movement of cycle switch 62 connects the D.C. supply to contact 80 thereby enabling bulbs 89, 90 or 91 to light upon depression of student buttons 69, 70 or 71. The supply to bulbs 89, 90 and 91 can only be cancelled during mode B upon operation by the teacher of cancel switch 63.

Mode C is operative when programming switch 62 is moved to connect contact 81 to the D.C. supply. During mode C bulb 89 will light only if button 69 is depressed before button 70 is depressed and bulb 90 will light only if button 70 is depressed before button 69. Operation of button 71 will short circuit the supply to bulbs 89 and 90 thereby extinguishing whichever one of the latter is lighting, and following depression of button 71 bulb 91 will remain lighting and can only be extinguished upon operation of cancel switch 63 by the teacher.

I claim:

1. An audio-vision display apparatus for reproducing audio and video information stored in a unit which comprises a magnetic tape spool and a disc mounted coaxially with said spool and carrying elements of video information at circumferentially spaced positions thereon, said spool carrying magnetic tape having recorded thereon, control signals and audio information associated with said video information, said apparatus comprising means for supporting said unit for rotation of said spool and said disc about their common axis, means for supporting a second spool to receive tape wound off from said first-mentioned spool, tape-reading means for reproducing said audio information and said control signals recorded on said tape, viewing means enabling said video information elements carried at said successive positions to be observed, drive means for winding said tape and for driving said disc in rotation and control means to control movement of said disc in response to said control signals reproduced by said tape-reading means, so that said disc is driven in rotation intermittently for observation of said video information carried at said successive positions, whereby said disc is advanced between said successive positions at predetermined intervals corresponding to the duration of the recorded audio-information associated with individual ones of said video-information elements.

2. Apparatus according to claim 1, in which separate drive means are provided for winding said tape and for driving said disc in rotation.

3. Apparatus according to claim 1, including clutch means through the intermediary of which said disc is driven by said drive means.

4. Apparatus according to claim 1, in which said control means include selectively operable locking mechanism for bringing said disc to rest and retaining it stationary in response to said control signals, thereby to provide intermittent rotation of said disc.

5. Apparatus according to claim 4, including a slipping clutch through the intermediary of which said disc is driven by said drive means, so as to allow said disc to be brought to rest by said locking mechanism.

6. Apparatus according to claim 4, in which said disc has circumferentially spaced indexing apertures therein and in which said locking mechanism comprises a solenoid-operated plunger movable into and out of engagement with said apertures in response to said control signals.

7. Apparatus according to claim 6, in which said control means include switch means which are actuable by said plunger to render said drive means inoperative and operative to drive said disc accordingly as said plunger is moved, respectively into and out of engagement with said apertures.

8. Apparatus according to claim 2, in which said unit includes an axial ferrule, said first-mentioned spool being keyed on said ferrule and said disc being freely rotatable thereon, said means for supporting said unit including a splindle connected to a first one of said separate drive means and the other of said separate drive means including a drive wheel adapted for frictional driving engagement with said disc.

9. Apparatus according to claim 1, in which said disc is formed with openings spaced circumferentially thereof, said video information elements comprising transparent slides engaged in said openings.

10. Apparatus according to claim 9, in which said viewing means comprises a projector and screen.

11. Apparatus according to claim 1, including tape regulating means for bringing said tape to rest and reversing it during winding thereof, said regulating means including a control lever for initiating forward and reverse operation of said drive means and for rendering said drive means inoperative, and braking means operating on said tape spools under the action of said control lever.

12. Apparatus according to claim 1, in which audio information associated with successive ones of said video information elements is recorded sequentially along the length of said tape.

References Cited

UNITED STATES PATENTS

| | | | |
|---|---|---|---|
| 2,581,079 | 1/1952 | Coutelen | 353—15 |
| 2,613,574 | 10/1952 | Moss | 353—15 |
| 2,930,285 | 3/1960 | Platt | 353—15 |
| 3,048,083 | 8/1962 | Rosenbaum | 353—15 |
| 3,142,909 | 8/1964 | Irazoqui | 353—18 |
| 3,233,512 | 2/1966 | Sampson | 353—15 |

HARRY N. HAROIAN, Primary Examiner